(12) United States Patent
Backmann et al.

(10) Patent No.: US 12,023,838 B2
(45) Date of Patent: Jul. 2, 2024

(54) SYSTEM FOR PRODUCING A BLOWN FILM

(71) Applicant: Windmöller & Hölscher KG, Lengerich (DE)

(72) Inventors: Martin Backmann, Lengerich (DE); Markus Bussman, Lengerich (DE); Jens Goldenstein, Lengerich (DE); Ingo Rübbelke, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 16/099,061

(22) PCT Filed: May 9, 2017

(86) PCT No.: PCT/EP2017/061024
§ 371 (c)(1),
(2) Date: Nov. 5, 2018

(87) PCT Pub. No.: WO2017/194520
PCT Pub. Date: Nov. 16, 2017

(65) Prior Publication Data
US 2019/0143573 A1  May 16, 2019

(30) Foreign Application Priority Data

May 9, 2016 (DE) .......................... 102016207951.4
May 10, 2016 (DE) .......................... 102016208031.8

(51) Int. Cl.
*B29C 48/10* (2019.01)
*B29C 48/00* (2019.01)
(Continued)

(52) U.S. Cl.
CPC .......... *B29C 48/0018* (2019.02); *B29C 48/10* (2019.02); *B29C 48/254* (2019.02);
(Continued)

(58) Field of Classification Search
CPC ... B29C 48/0018; B29C 48/10; B29C 48/254; B29C 48/32; B29C 48/885; B29C 48/89;
(Continued)

(56) References Cited

U.S. PATENT DOCUMENTS 3,888,609 A * 6/1975 Saint Eve et al. ...... B29C 48/10
                                                425/72.1
4,080,143 A * 3/1978 Upmeier ................. B29C 48/30
                                                425/445
(Continued)

FOREIGN PATENT DOCUMENTS

JP  S58 094433  6/1983
JP  S58 107315  6/1983
(Continued)

OTHER PUBLICATIONS

English translation of Norway 126423, 1973. (Year: 1973).*
(Continued)

*Primary Examiner* — Xiao S Zhao
*Assistant Examiner* — Joseph S Leyson
(74) *Attorney, Agent, or Firm* — Sunstein LLP

(57) ABSTRACT

The invention relates to a blown film line for generating a blown film with at least one extruder for generating at least one melt strand, at least one distribution tool for converting the at least one melt strand into a circulating melt layer, an outlet nozzle for outputting the at least one melt layer, wherein this melt layer forms the blown film, and at least one device for subjecting the blown film to at least one fluid stream, in particular an air stream, for cooling the blown film. At least one pressure-providing device is furnished, with which the blown film may be brought to the device for subjecting the blown film to a fluid stream by means of at least one overpressure and/or one underpressure.

5 Claims, 15 Drawing Sheets

(51) Int. Cl.
  *B29C 48/25* (2019.01)
  *B29C 48/49* (2019.01)
  *B29C 48/88* (2019.01)
  *B29C 48/885* (2019.01)

(52) U.S. Cl.
  CPC ............ *B29C 48/49* (2019.02); *B29C 48/885* (2019.02); *B29C 48/9125* (2019.02); *B29C 48/913* (2019.02)

(58) Field of Classification Search
  CPC . B29C 48/902; B29C 48/903; B29C 48/9125; B29C 48/913
  See application file for complete search history.

(56) References Cited

U.S. PATENT DOCUMENTS

| | | | | |
|---|---|---|---|---|
| 4,473,527 A | | 9/1984 | Fujisaki et al. | |
| 4,728,277 A | * | 3/1988 | Planeta | B29C 48/10 425/72.1 |
| 5,281,375 A | * | 1/1994 | Konermann | B29C 48/92 264/40.3 |
| 5,580,582 A | * | 12/1996 | Achelpohl | B29C 48/92 425/72.1 |
| 2008/0061460 A1 | * | 3/2008 | Zimmermann | B29C 55/28 425/141 |
| 2017/0203472 A1 | * | 7/2017 | Cree | B29C 48/913 |
| 2017/0203473 A1 | * | 7/2017 | Cree | B29C 48/9125 |
| 2017/0203489 A1 | * | 7/2017 | Cree | B29C 48/10 |

FOREIGN PATENT DOCUMENTS

| | | | |
|---|---|---|---|
| JP | H09 123273 | | 5/1997 |
| JP | 2002 067146 | | 3/2002 |
| JP | 2010 247453 | | 11/2010 |
| NO | 126423 | * | 2/1973 |

OTHER PUBLICATIONS

International Searching Authority, International Preliminary Report on Patentability—Application No. PCT/EP2017/061024 dated Nov. 22, 2018, together with Written Opinion, 9 pages (English Translation).

International Searching Authority, International Search Report—Application No. PCT/EP2017/061024 dated Nov. 16, 2017, together with Written Opinion, 14 pages (This document also contains 3 pages of translated ISR).

* cited by examiner

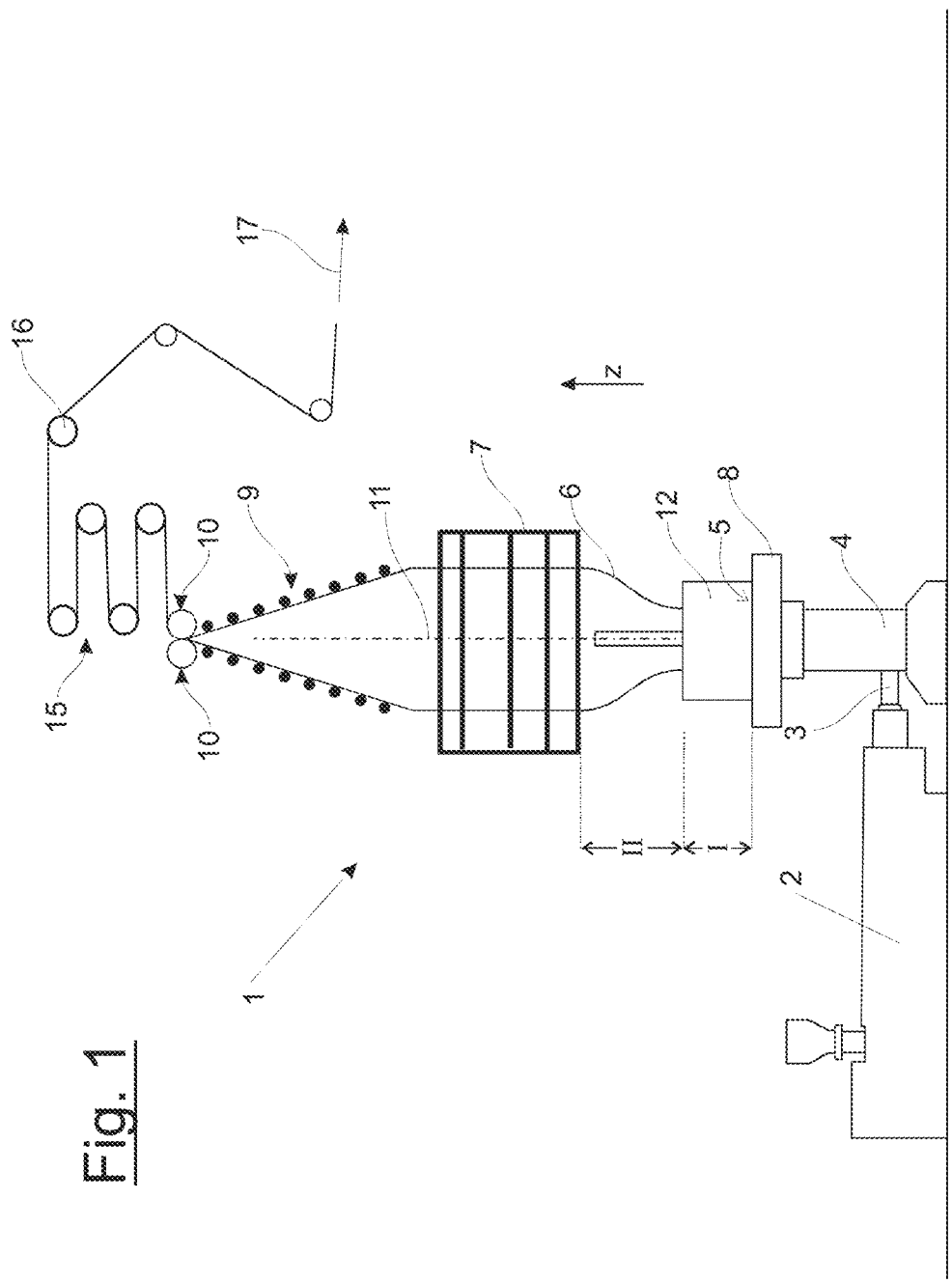

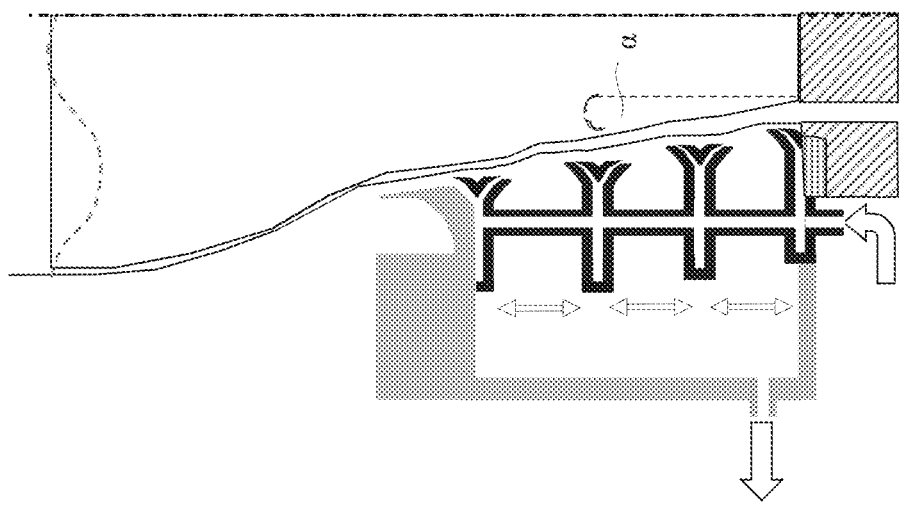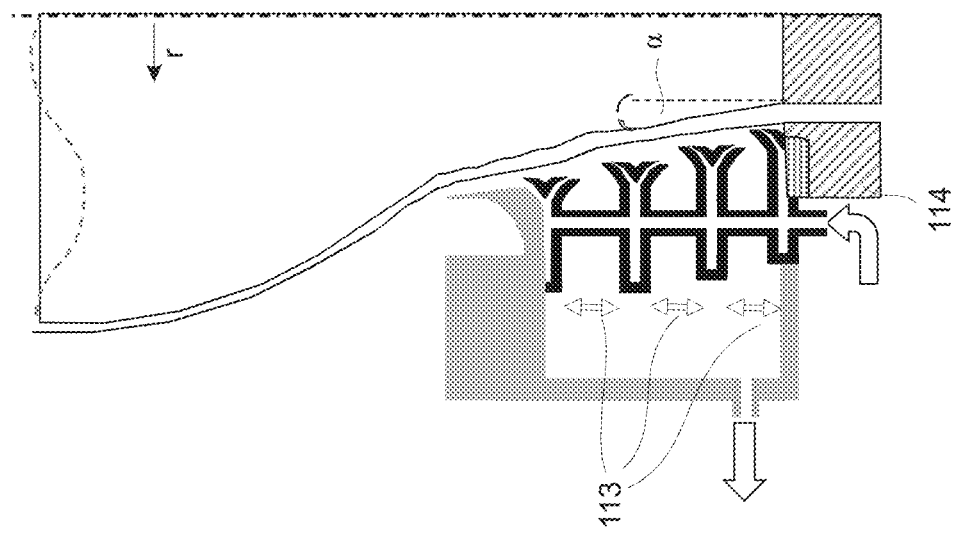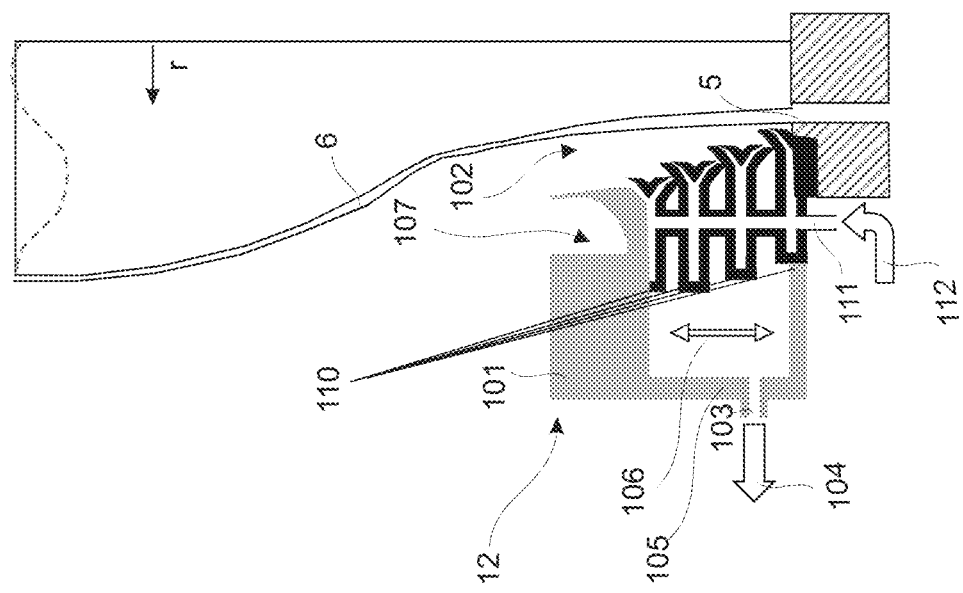

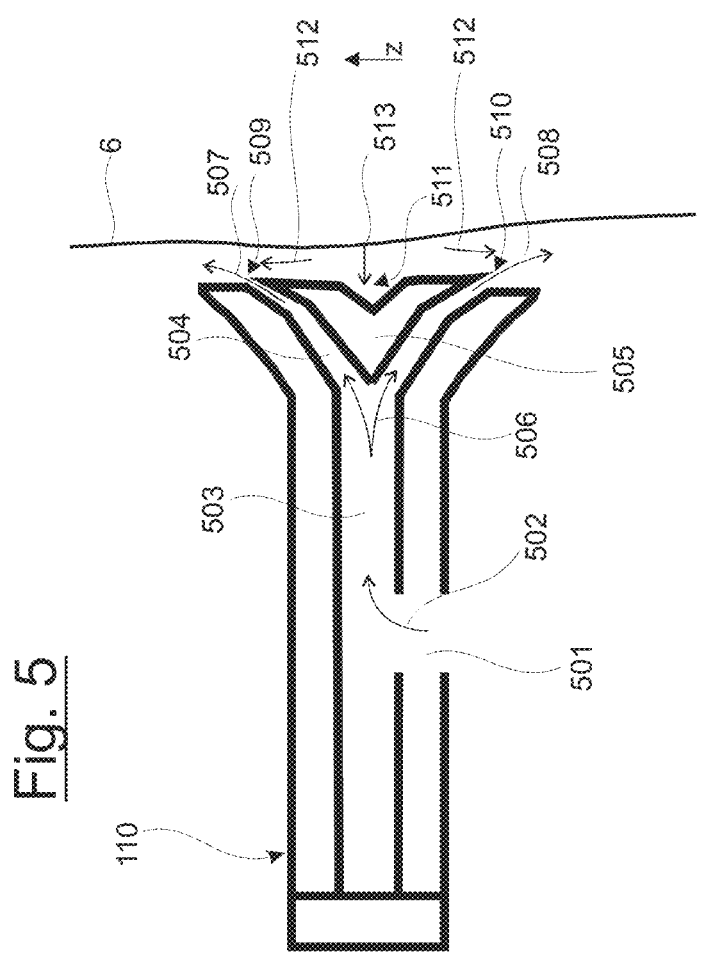

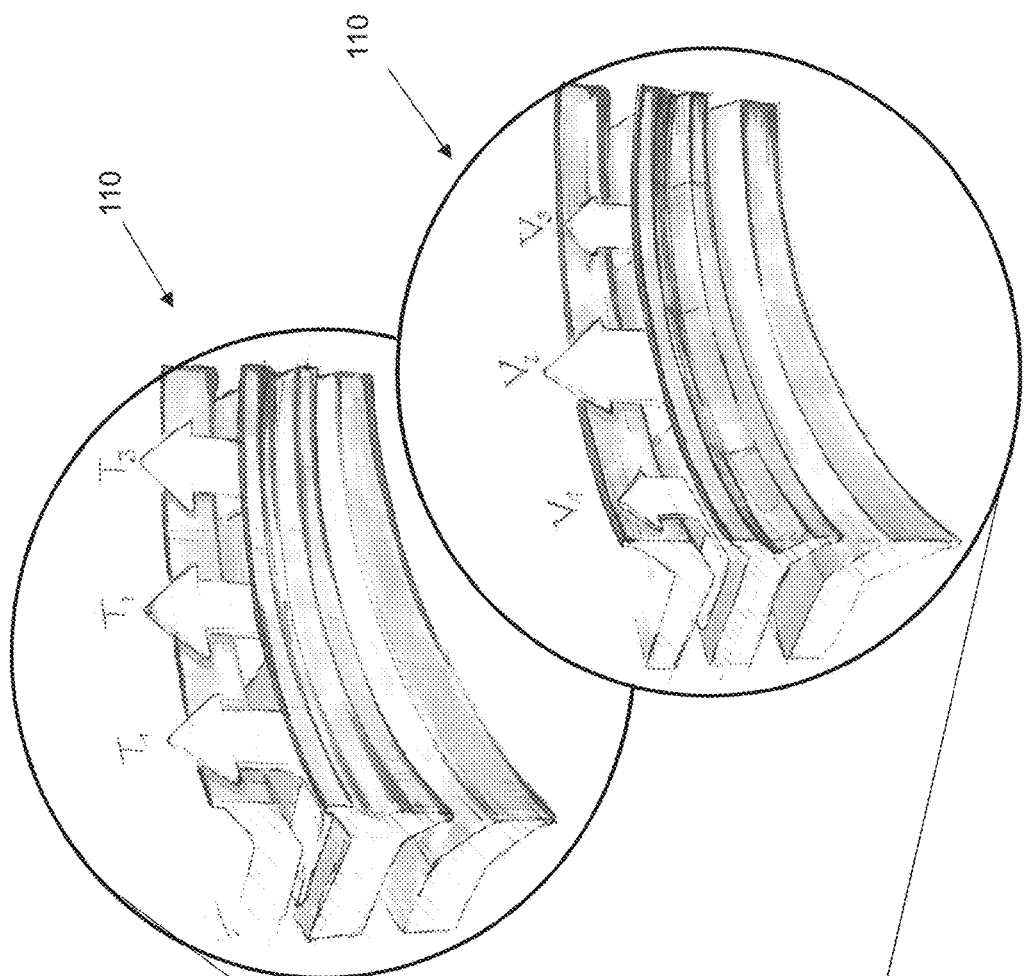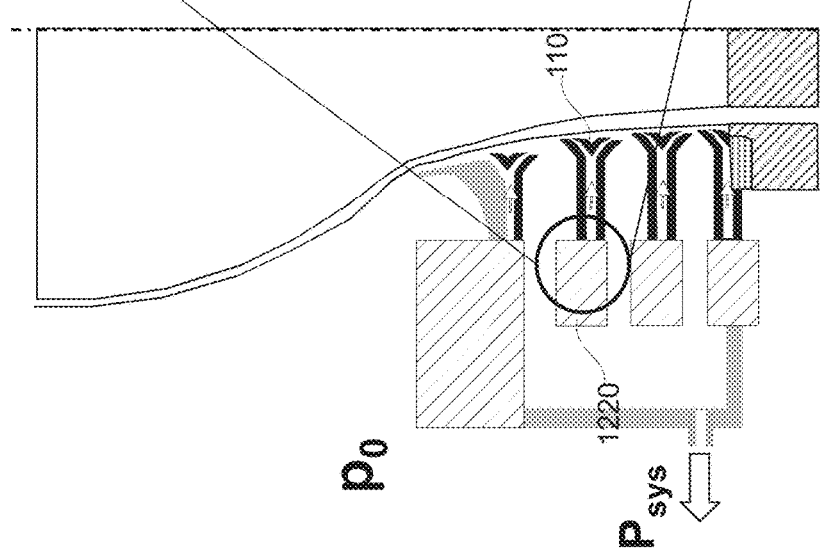

SYSTEM FOR PRODUCING A BLOWN FILM

The invention relates to a blown film line for manufacturing blown film.

A blown film line of this kind, wherein the blown film line produces a blown film, is used for the efficient production of film. In the blown film line, at the outset, at least one extruder is furnished, with which at least one melt strand is generated—preferably from a raw material. This is followed by at least one distribution tool for converting the at least one melt strand into a circulating melt layer. This melt layer then passes to an outlet nozzle, which is usually circular, and with which the at least one melt layer may be dispensed. After exiting the outlet nozzle, the melt layer forms the blown film. This blown film cools gradually, because it may now release heat into the environment. Only after a certain cooling time, the blown film has solidified so that it substantially retains its format, in particular the bubble circumference and wall thickness. This transition is called the frost line or the frost area. A blown film that has gone beyond this frost area may be flattened and pulled off.

In manufacturing a blown film, the production speed depends essentially on how fast the blown film cools down. To accelerate the cooling, it is known in the art to provide a device for subjecting the blown film to at least one fluid stream, particularly an air stream, in order to additionally transfer heat away or cool the blown film.

However, it has been shown that this measure also has limits, i.e. that the effectiveness of this measure may not be increased arbitrarily.

The objective of the present invention is therefore to propose a blown film line by means of which the production speed of a blown film may be further increased.

According to the invention, this objective is achieved by the combined features of the independent claims. Possible configurations of the invention are set forth in the dependent claims.

According to the present invention, it is contemplated that at least one pressure-providing device is furnished, by means of which the blown film may be brought to the device for subjecting the blown film to a fluid stream by means of at least one overpressure and/or one underpressure. Overpressure or underpressure here signify a pressure that is increased or reduced in relation to the ambient pressure prevailing in the vicinity of the blown film line.

The invention is based on the recognition that increasing the loading of the blown film with at least one fluid stream does not improve cooling, because the greater quantity of fluid per unit time may not be completely brought to the blown film. One reason for this, among others, is that the blown film may pull back.

It is therefore contemplated according to the invention that the blown film is held close to the device for subjecting the blown film to at least one fluid stream (hereinafter referred to as the "fluid loading device"), by means of an additional force acting in the direction of this device, so that the fluid may be used as completely as possible to remove heat. As a result, the cooling power and thus the production speed of the blown film may be increased relative to prior art systems.

There are basically two options for generating the mentioned force. First, the blown film may be pulled toward the fluid loading device. In one embodiment of the invention, this done by means of an underpressure on the side of the fluid loading device. This means that the fluid stream and the underpressure act on the same side of the blown film (inside the blown film or outside the blown film). The fluid stream causes an overpressure, but the resulting force increases as distance decreases. The underpressure acts simultaneously, the overpressure resulting from the fluid stream and the aforementioned underpressure establishing an equilibrium with regard to the forces acting on the blown film.

Alternatively or in addition, on the side of the wall of the blown film facing away from the fluid loading device, a device may be furnished that provides an overpressure, and by this means the blown film may be pressed against the fluid loading device. In this case, the fluid loading device and the pressurization device may be arranged directly opposite one another, when viewed in the transport direction. In this case as well, a pressure equilibrium may be adjusted, either leading the blown film close to the fluid loading device or holding it there.

In a first embodiment, the fluid loading device and the pressure-providing device may be arranged within the blown film. It is advantageous in this case that the blown film may, without difficulty, be pulled manually from the outlet nozzle at the start of production and then pulled through the subsequent apparatus.

In a second embodiment, the fluid loading device and the pressure-providing device may be arranged outside the blown film. The improved accessibility of these two devices even during production is advantageous in this case.

In an additional embodiment, the fluid loading device may be arranged outside the blown film and the pressure-providing device may be arranged inside the blown film. In this case it is advantageous that both devices generate an overpressure, reducing the need for parts such as blowers.

It is advantageous if the pressure-providing device is situated on or within the fluid loading device, and has a shape and/or an arrangement by means of which an underpressure may be generated as a result of to the fluid stream. This exploits the Bernoulli effect, in which a fluid stream generates a static underpressure when its speed is increased—for example, by a constriction. In the context of the invention, this static underpressure then serves to supply the blown film to the fluid loading device. Additionally or alternatively, this part or another part may be connected to a negative-pressure source such as the suction side of a blower or compressor. In this way, the fact that the magnitude of the underpressure may be adjusted by the power of the blower or compressor provides an additional possible way of controlling the underpressure.

Further details, features and advantages of the invention will be apparent from the following description in which various exemplary embodiments are explained in detail with reference to the drawings. The features mentioned in the claims and in the description may be essential to the invention, either respectively by themselves, or in any combination of the mentioned features. Within the scope of the disclosure as a whole, features and details that are described in connection with the method of the invention may of course also be applied respectively with regard to the blown film of the invention, and vice versa, so that reference always is or may be reciprocal with respect to the disclosure of the individual aspects of the invention. The individual drawings show:

FIG. 1 is a schematic view of a blown film line according to an embodiment of the invention.

FIG. 2 shows a cooling box according to an embodiment of the invention.

FIG. 3 shows a cooling box according to an embodiment of the invention.

FIG. 4 shows a cooling box according to an embodiment of the invention.

FIG. 5 shows an operating principle of a ring according to an embodiment of the invention.

FIG. 12, FIG. 12A, and FIG. 12B show an alternative embodiment of the invention.

Figure 13:
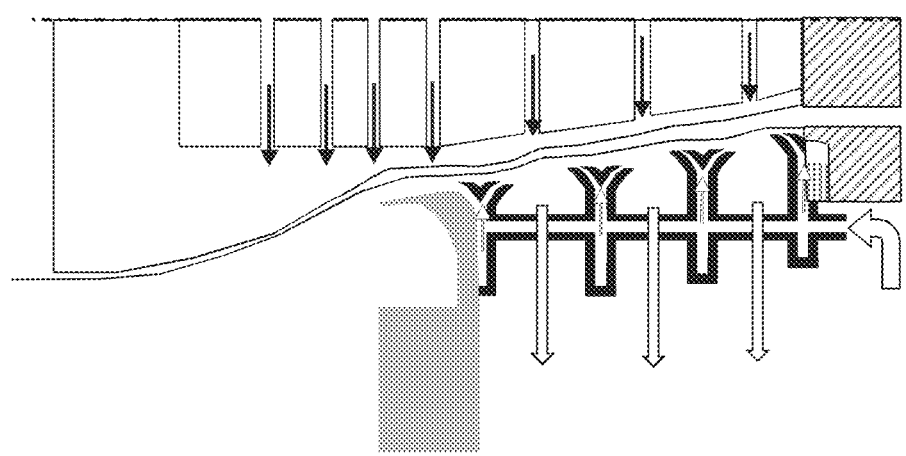

FIG. 13 depicts an alternative embodiment of the invention.

Figure 14:
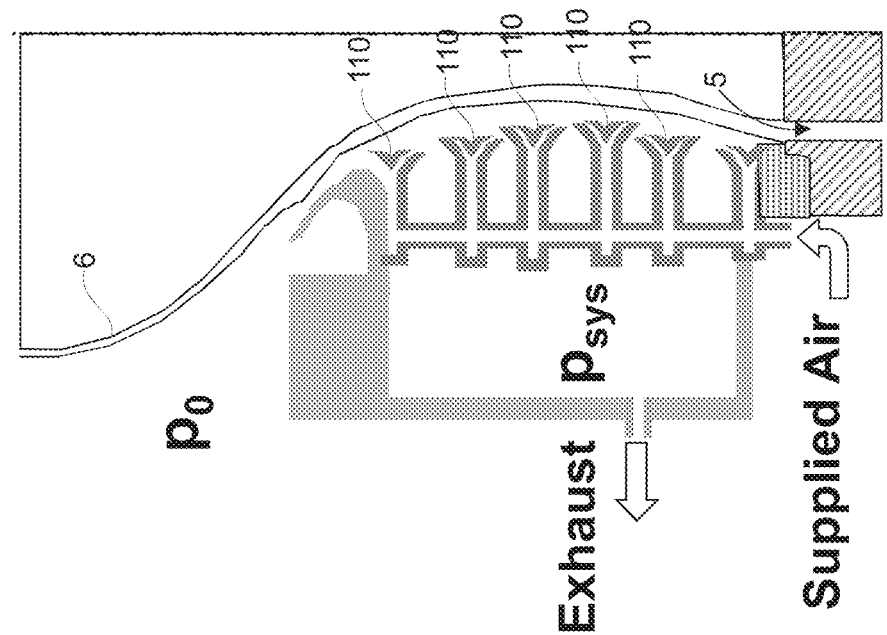

FIG. 14 shows an arrangement of rings according to an embodiment of the invention.

Figure 15:
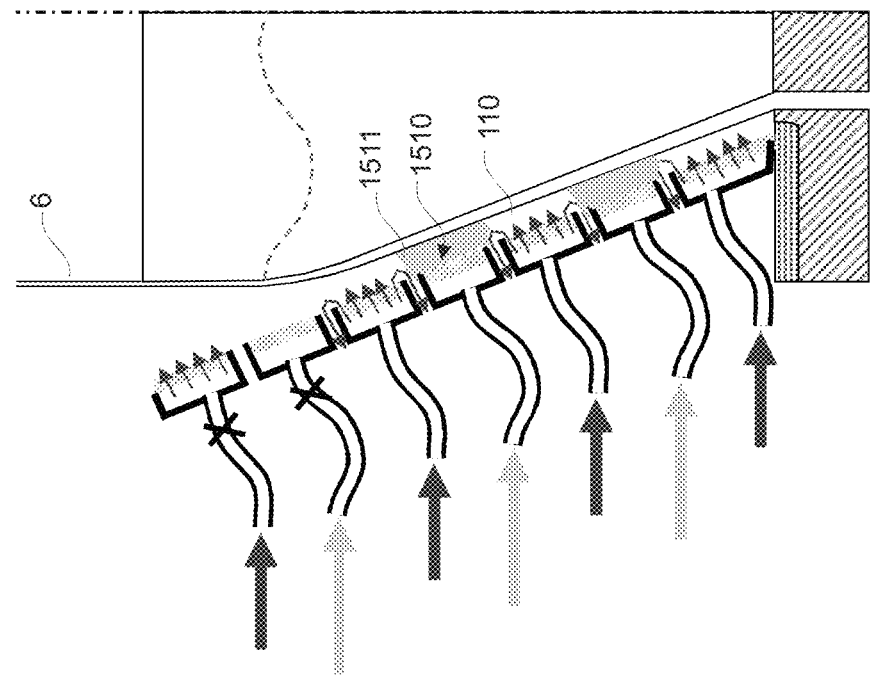

FIG. 15 shows an alternative embodiment of the invention.

Figure 16:
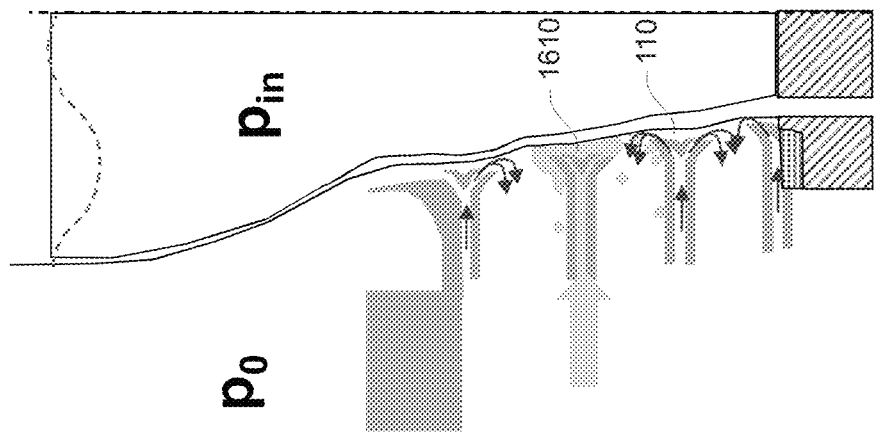

FIG. 16 shows a related embodiment of the invention.

Figure 17:
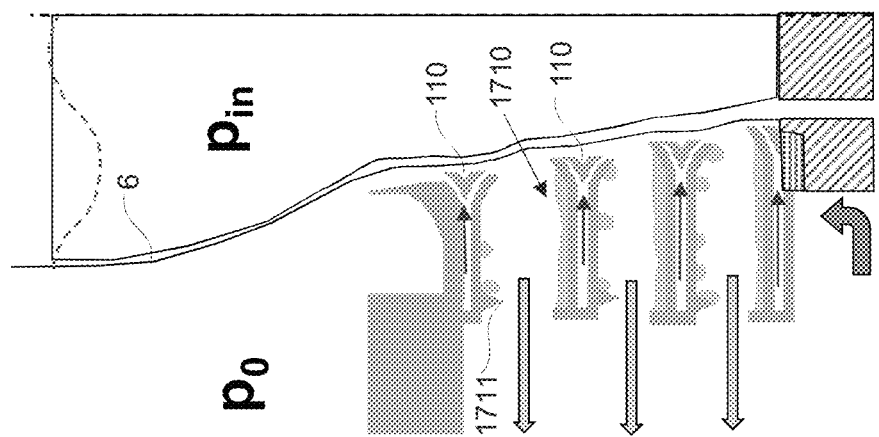

FIG. 17 shows an alternative embodiment of the invention.

Figure 18:
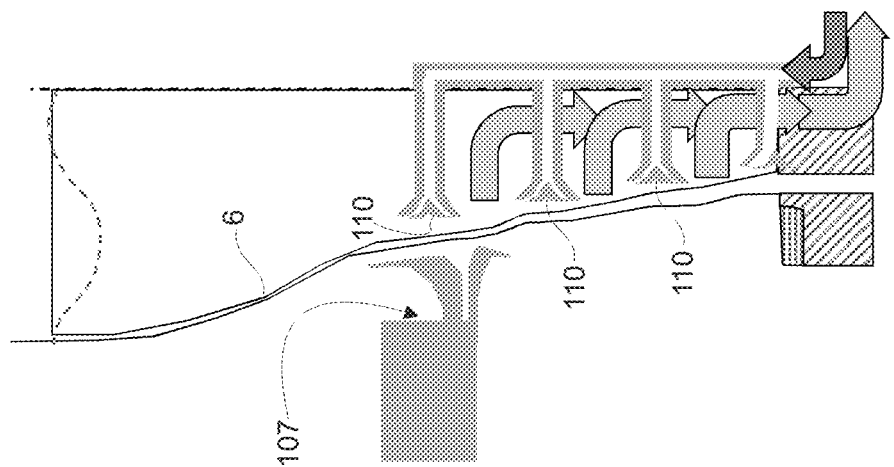

FIG. 18 shows an alternative embodiment of the invention.

Figure 19:
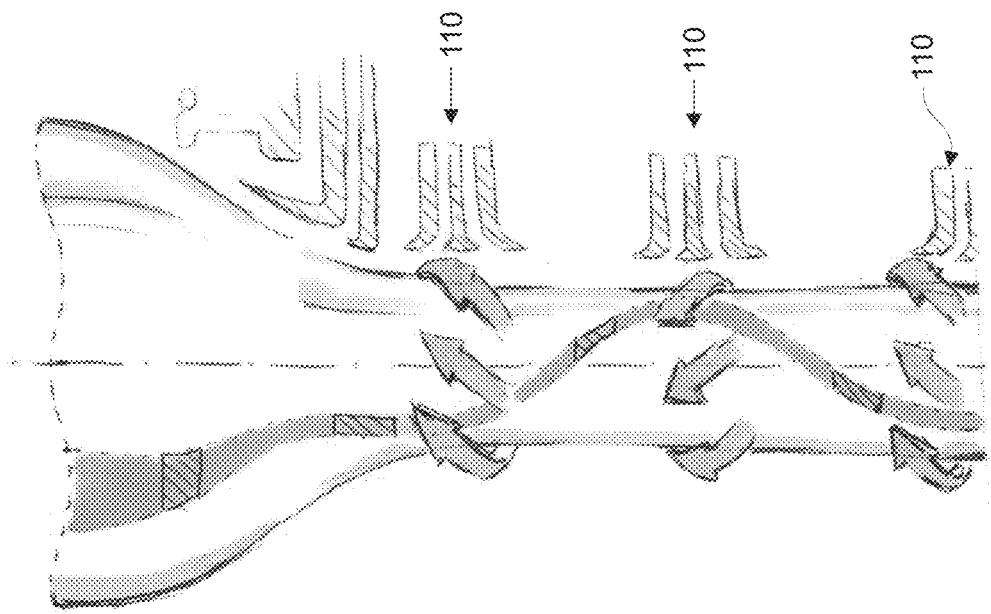

FIG. 19 shows an alternative embodiment of the invention.

Figure 20:
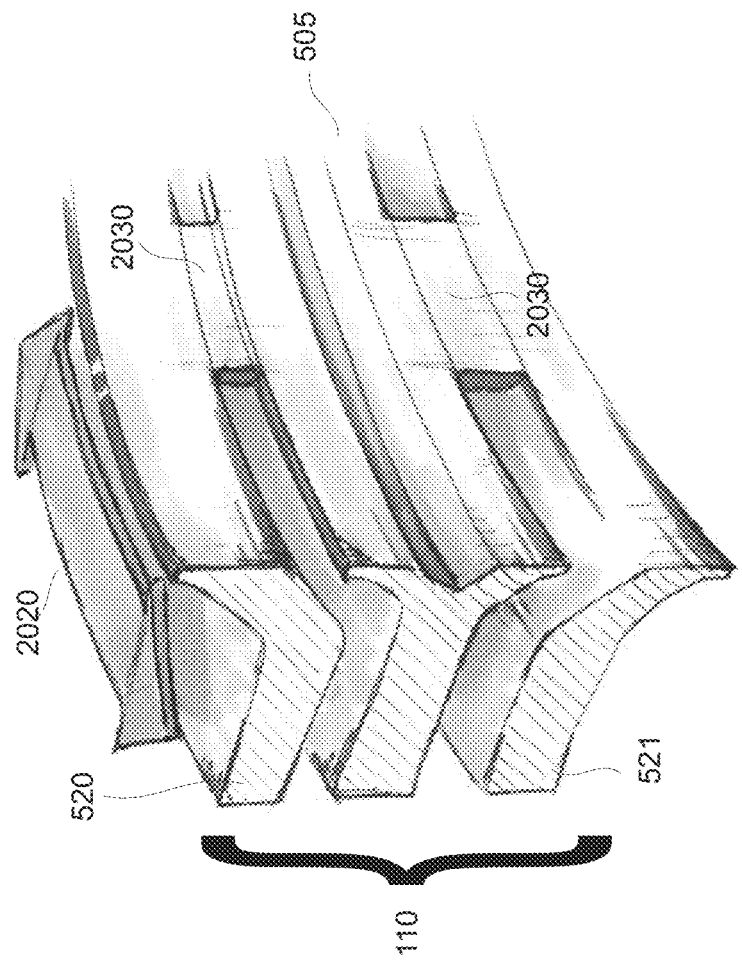

FIG. 20 shows an alternative embodiment of the invention.

Figure 21:
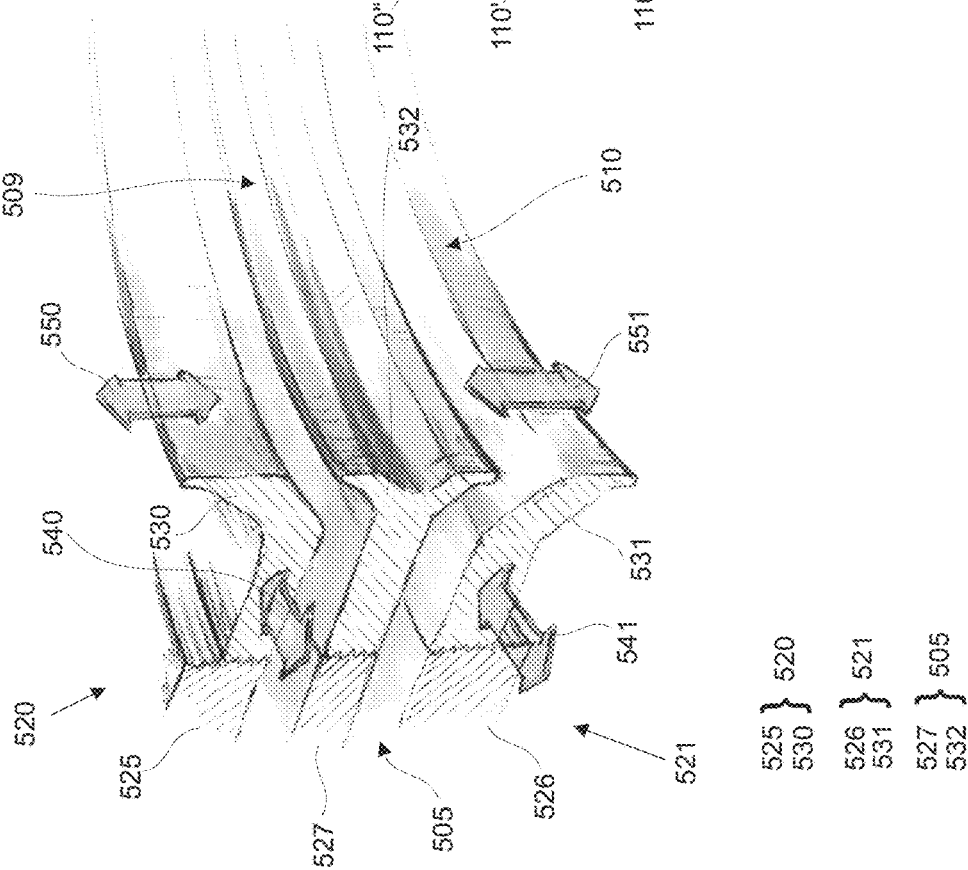

FIG. 21 shows an alternative embodiment of the invention.

Figure 22:
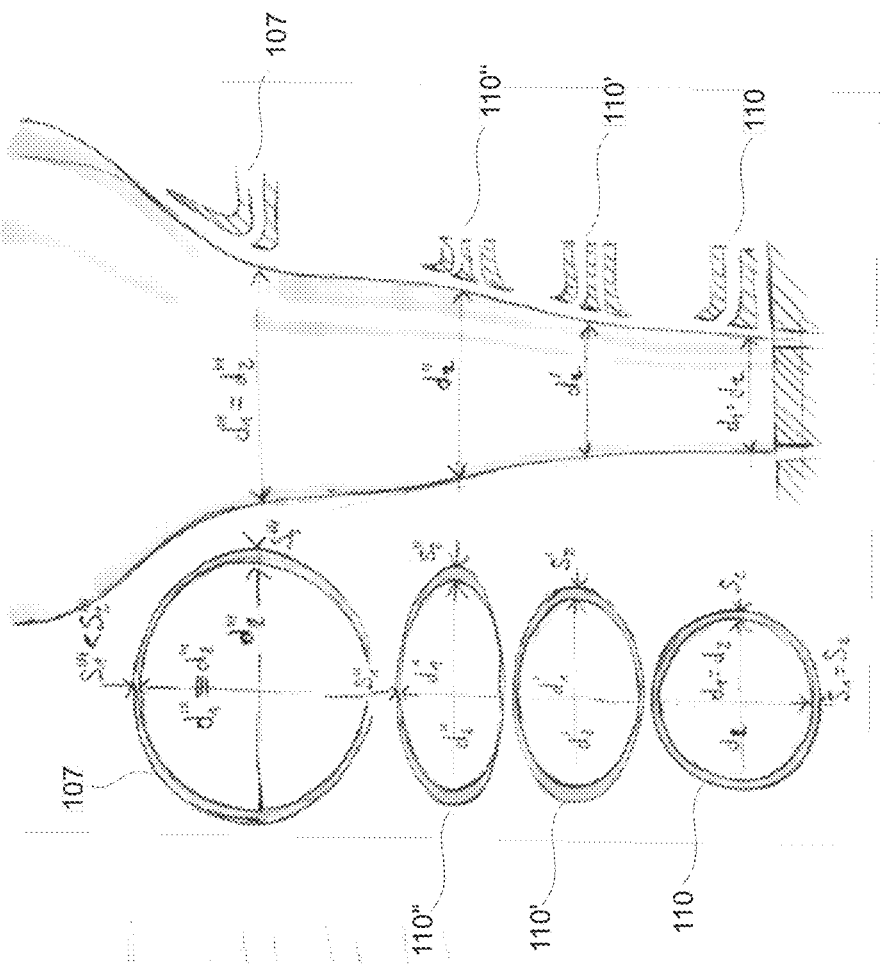

FIG. 22 shows an alternative embodiment of the invention.

Figure 23:
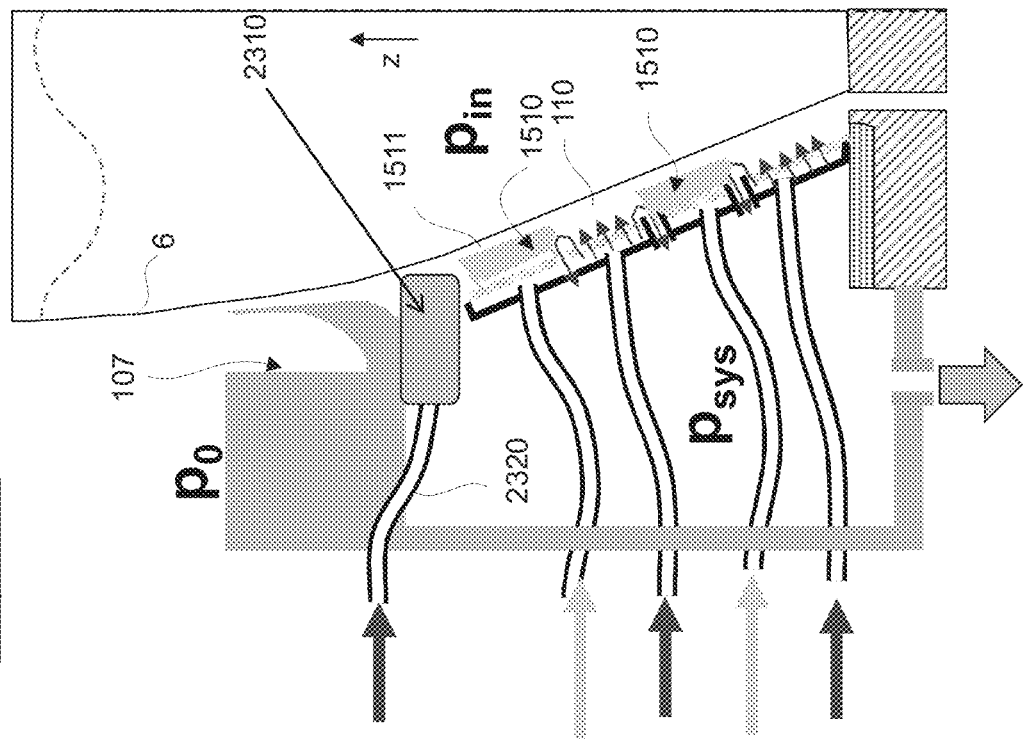

FIG. 23 shows an alternative embodiment of the invention.

Figure 24:
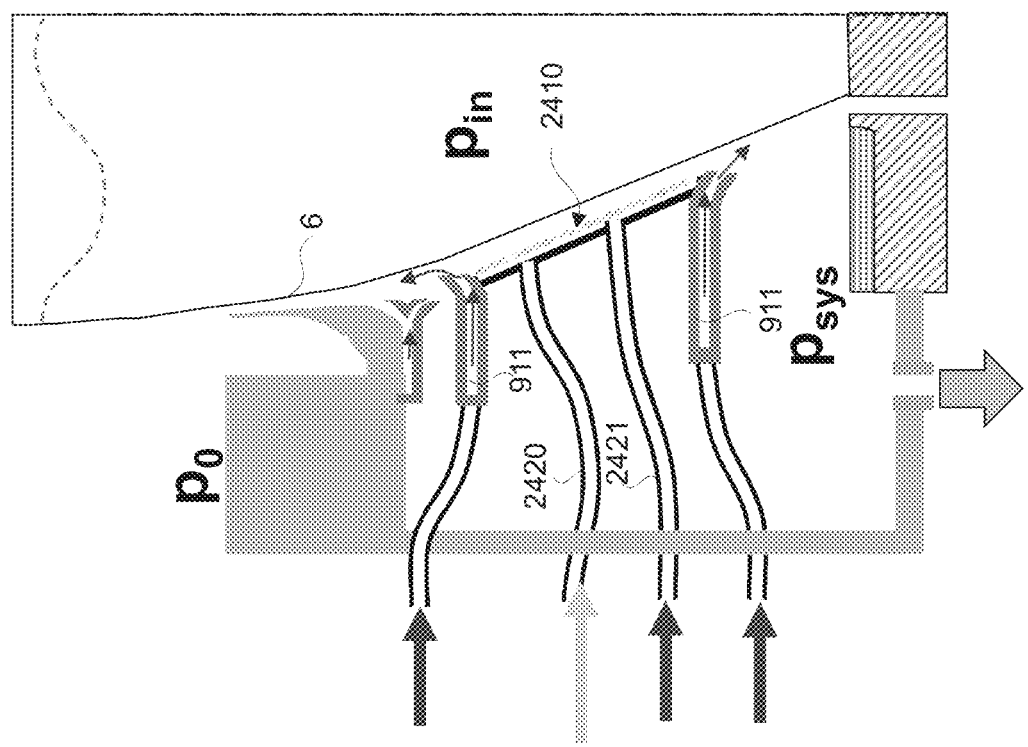

FIG. 24 shows an alternative embodiment of the invention.

Figure 25:
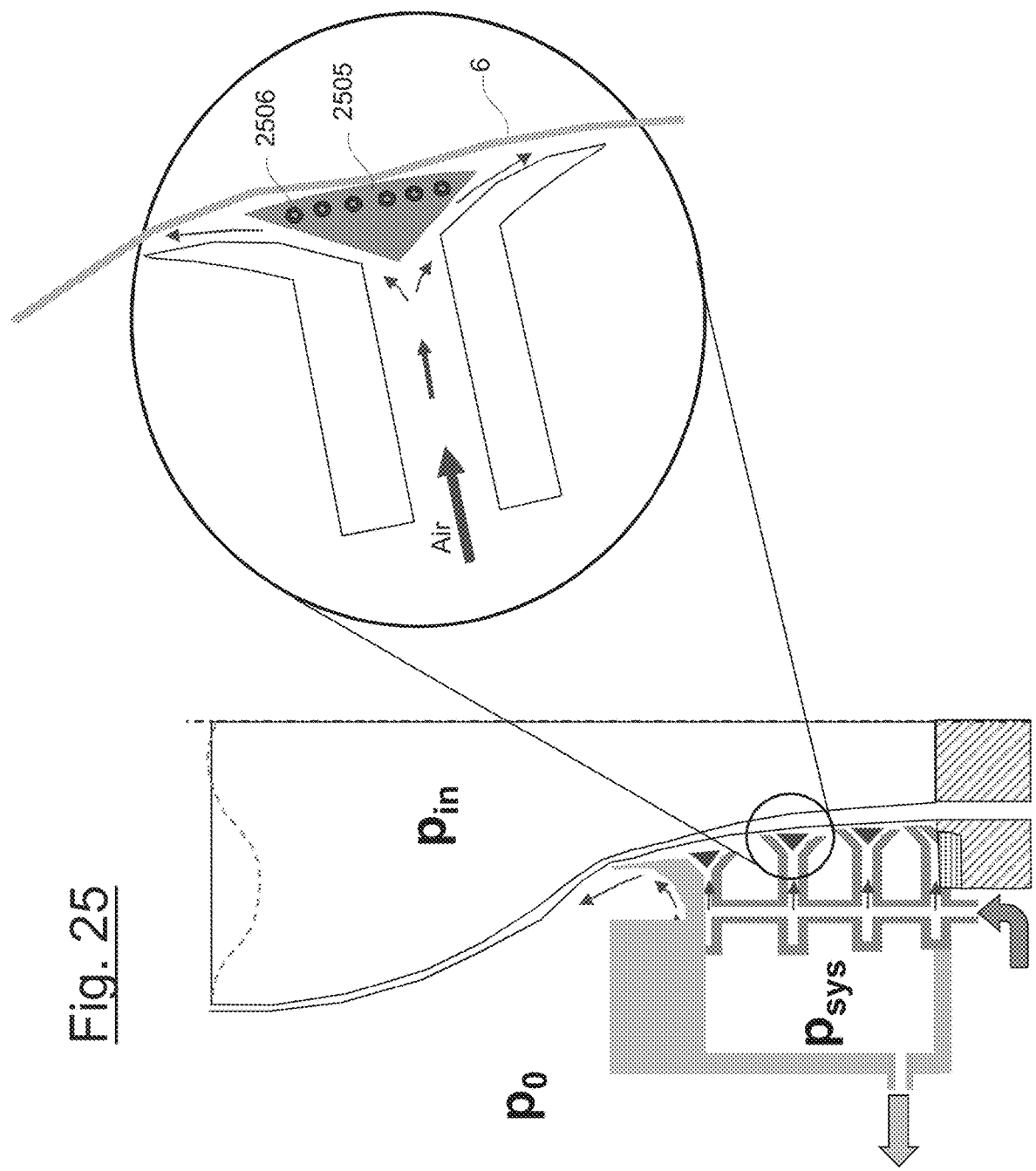

FIG. 25 shows an alternative embodiment of the invention.

Figure 26:
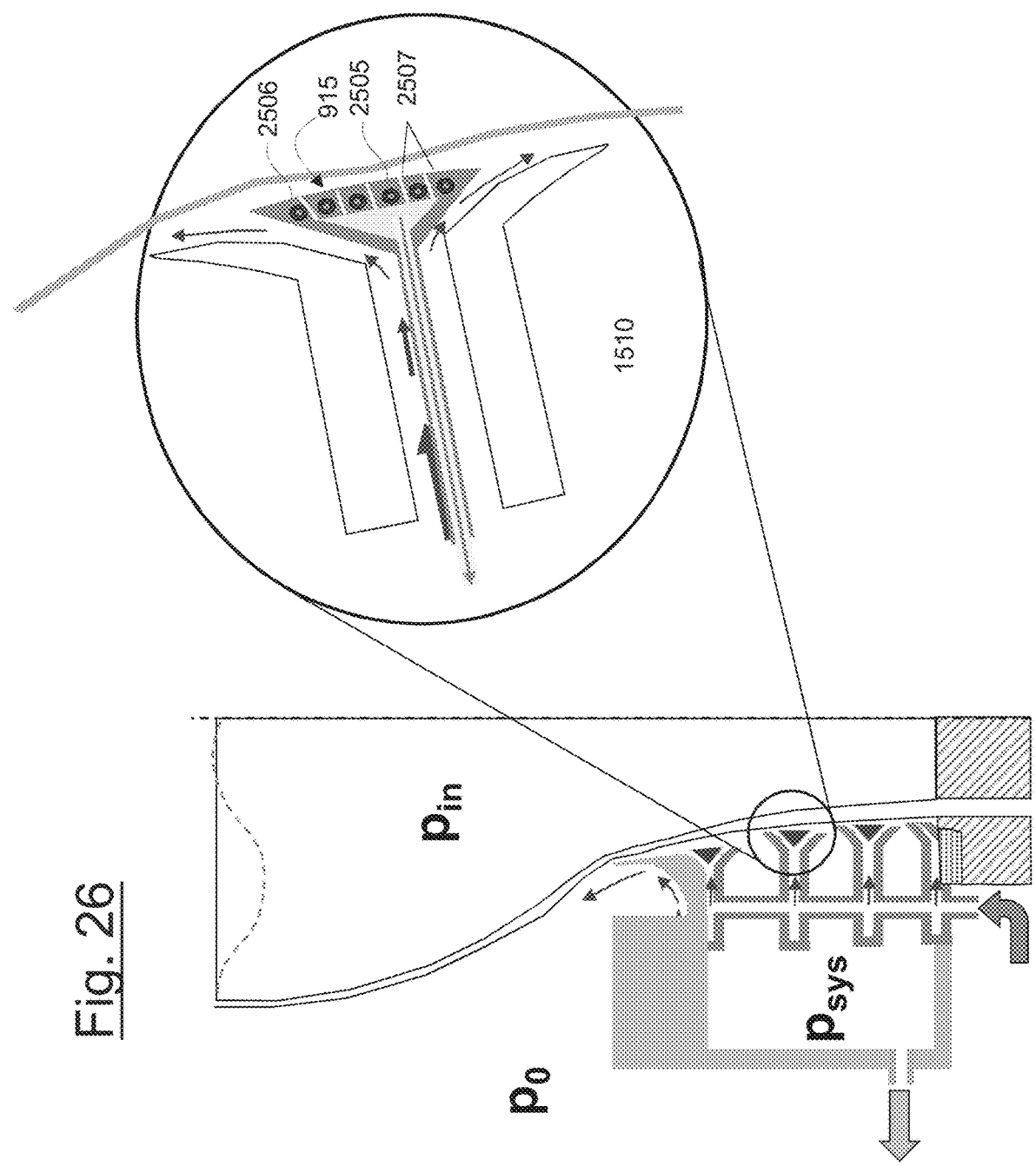

FIG. 26 shows an alternative embodiment of the invention.

FIG. 1 shows a blown film line 1 for producing a blown film, which initially comprises at least one extruder 2, with which, for example, plastic in granular form may be plasticized. The plastic melt thus generated is supplied via a line 3 to a distribution tool 4, where this melt is converted into a cylindrical melt stream, so that this melt stream may be withdrawn from an outlet nozzle 5, not visible in this drawing, in the withdrawal direction z. A blown film 6 is now present, which has not yet solidified. This melt stream now passes into a cooling box 12 in the area I, and in this cooling box, the blown film is guided in a cylindrical or slightly conical shape. This cooling box comprises at least one device for subjecting the blown film to at least one fluid stream and at least one pressure-providing device by means of which, with at least one overpressure and/or underpressure, the blown film 6 may be brought to the device for subjecting the blown film to at least one fluid stream. Details and advantageous exemplary embodiments of this cooling box will be presented and explained with reference to the following drawings.

After leaving the cooling box 12, in the area II the blown film 6 is inflated from the inside by a slight overpressure, so that it has a larger diameter within the optional calibration apparatus 7. A solidification of the film tube is effected by at least one temperature-control apparatus 8, which is often referred to as a cooling ring because of its ring-like configuration, enclosing the film tube enclosing configuration. This cooling ring may—as shown in the present drawing—be arranged below the cooling box 12. Alternatively, such a cooling ring may also be furnished above the cooling box 12.

After passing through the calibration apparatus, the film tube 6 enters the effective range of a flattening apparatus 9, in which the largely circular film tube is converted into an elliptical cross-section with increasing eccentricity until finally, in the zone of influence of the take-off rollers, forms two superimposed film webs that are connected to each other on their sides.

The flattening device is arranged rotatably, the rotational axis being substantially aligned with the tube axis 11, which is indicated by a dot-dash line in FIG. 1.

FIG. 1 also shows a reversing device 15, which serves to guide the flattened film tube from the flattening apparatus to the stationary roller 16 without any damage occurring. The arrow 17 indicates that this film tube is now fed to further processing, which is not further specified herein.

FIGS. 2, 3 and 4 show a first embodiment of the cooling box 12. This cooling box initially comprises a box 101, which may for example be cubic, block-shaped or cylindrical. The blown film passage 102, in contrast, is adapted to the shape of the film and is therefore preferably circular. The upper portion of the box may comprise a cooling ring 107, which is known in the art. Such a cooling ring 107 may also be placed on the box 101. The box 101 further comprises at least one exhaust opening 103, via which the box may be subjected to an underpressure. This is indicated by the arrow 104. For this purpose, the exhaust opening 103 may be connected to a negative-pressure source, not shown, and this source may advantageously be a blower or a pump. Due to the prevailing underpressure, the blown film is subjected to a force acting radially outwards, so as both to dissipate the fluid stream applied to the blown film by the rings 110, and also to pull the film further against the rings 110. The box 101 may comprise side walls 105 that are orthogonal to the z direction, so that these parts may be displaced relative to one another, while always having an overlap. In the area of the overlap, a seal may be furnished. This arrangement serves to allow the box to change its height in the z direction, which is shown by the arrow 106. Thus, preferably, when starting up the blown film line, the box 101 may be shrunk so that an operator may better reach the outlet nozzle 5. During operation, however, the height of the box may be adapted in such a way that the edge of the box delimiting the blown film passage 102 is arranged as close as possible to the blown film 6. This is shown in FIGS. 3 and 4.

Inside the cooling box 12, rings 110 are also arranged, via which a fluid may be applied to the blown film 6. For this purpose, the rings are supplied with the fluid via a shared supply channel 111, which is indicated by the arrow 112. The fluid here is subjected to an overpressure. The function of such a ring 110 will be explained below with reference to FIG. 5. The supply channel 111 may be configured between the individual rings as a flexible hose, bellows, or the like. The reason is that the distance between the rings 110 may be adjusted, as indicated by the arrows 113 in FIG. 3. In this case, the lower ring may be arranged on the tool 114 in the area of the outlet nozzle 6 and preferably fastened there, while the upper ring may be arranged on a wall of the box 101.

The individual rings may be mounted on guides that extend in the circumferential direction of the blown film, but are also inclined in the z direction, so that movement along the guide simultaneously leads to movement in the z direction. As a result, to adjust the height of the rings, it is only necessary to rotate them in the circumferential direction, which is very straightforward and comfortable. Alternatively, however, an arrangement of guides in the z direction is possible, so that a simple displacement/travel in the z direction is sufficient. In another embodiment, for example, the rings may be connected to each other via elastic elements, so that a height adjustment of the box is sufficient to also adjust the rings in their height positions. If the spring constants of the elastic elements are the same or comparable, the rings have an equal distance between one another.

It may be provided that the diameter of the rings increases along the z direction. In this way, the blown film 6 may be guided conically, i.e. the diameter of the blown film increases in the z direction within the cooling box 12. By height adjustment of the rings 110, therefore, the angle of the blown film relative to the z direction (i.e. the opening angle a) may be adjusted. Two different opening angles a are shown in FIGS. 3 and 4. For example, the opening angle is approximately 5° in FIG. 3 and approximately 3° in FIG. 4.

FIG. 5 shows the operating principle of a ring 110. The fluid stream, marked by the arrow 502, enters the inner space 503 through the opening 501 and there is directed toward the blown film 6. At the end of the inner space facing the blown film 6, the inner space comprises a widened area 504. In this widened area 504, a flow divider 505 is furnished that divides the fluid stream into two partial streams—preferably equal—(see split arrow 506) and deflects them, so that a first partial stream (arrow 507) is deflected at least partially in the z direction and a second partial stream (arrow 508) is deflected at least partially opposite the z direction. In this case, the flow divider 505 and widened area 504 form two outlets 509 and 510, and the respective flow cross sections become narrower in the flow direction. As a result, the flow velocities of the partial streams increase, and consequently an underpressure arises at the edges of the area 511 between the flow divider 505 and blown film 6, so that the air located there is drawn out, as indicated by the arrows 512. Ultimately, this results in a force 513 that acts on the blown film and is directed radially outward, and by this means, the blown film is pulled toward the ring. The ring 110 and the flow divider are preferably rotationally symmetrical, so that the force acting on the blown film 6 is also rotationally symmetrical.

Figure 6:
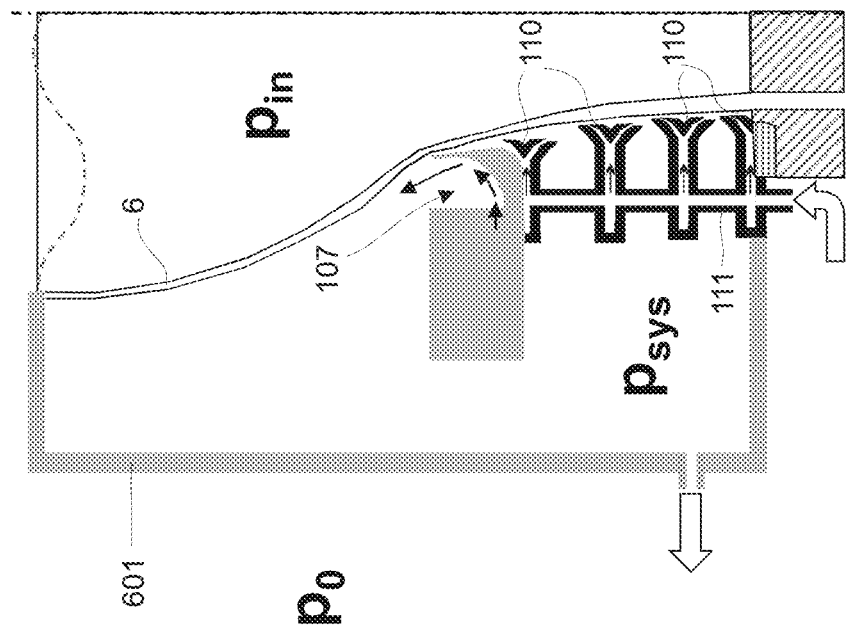
FIG. 6 shows an alternative embodiment of the invention.

FIG. 6 shows an additional embodiment of the invention, which resembles the embodiment of FIGS. 2 to 4. The box 601 preferably has a fixed height. It is advantageous if this height also comprises the area II (see FIG. 1). The rings 110 are located within the box 601, and none of the rings 110 are attached to the box 601. Above the rings 110, but within the box 601, the cooling ring is also arranged.

FIG. 6 also illustrates the prevailing pressure ratios. Within the blown film, the internal pressure is $p_{in}$, which is greater than the ambient pressure $p_0$. The pressure prevailing in the box is less than both $p_{in}$ and $p_0$. In order to achieve the pressure $p_{sys}$, once again preferably a blower or compressor is furnished. The rings are in turn supplied with a fluid stream via a shared supply channel.

Figure 7:
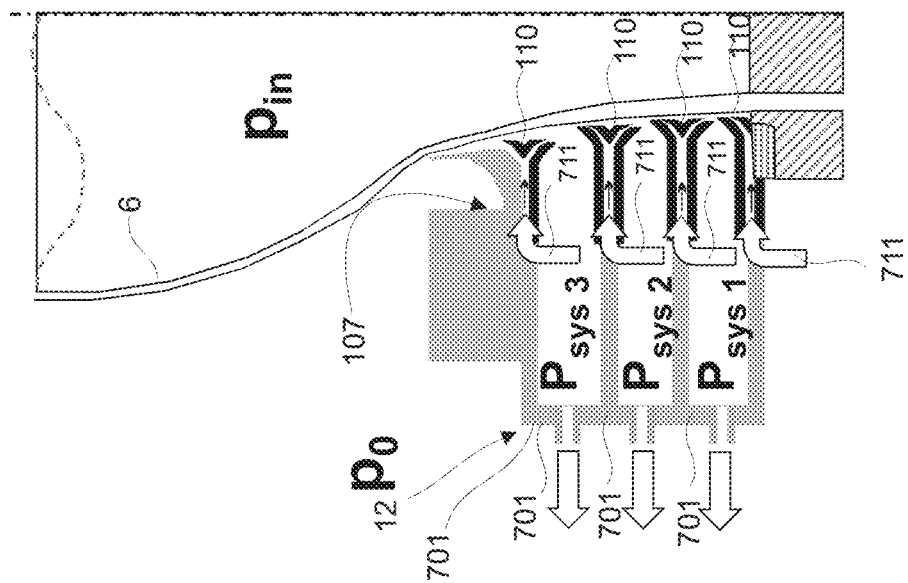
FIG. 7 shows yet another alternative embodiment of the invention.

FIG. 7 shows another structure. In this exemplary embodiment, each ring 110 is associated with a separate box 701, and each box preferably also has its own suction channel 703. In this way, the pressure $p_{sys}$ may be separately controlled in each box 701. In addition, each ring has a supply channel 711. As a result of this arrangement, the fluid stream of each ring 110 and the pressure $p_{sys}$ may be separately controlled or regulated, so that the shape of the blown film 6 and also the cooling power may be adapted as needed. In addition, a cooling box 12 configured in this way may constructed in a modular fashion. If required, additional boxes 701 may simply be placed on the uppermost box, or boxes 701 may be removed.

Figure 8:
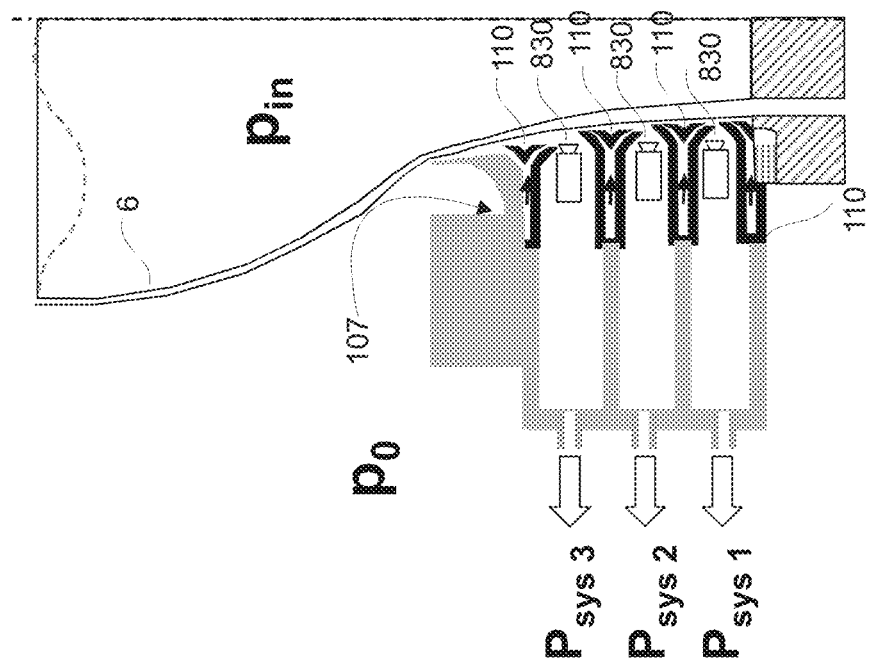
FIG. 8 shows an alternative embodiment of the invention.

FIG. 8 shows an extension of the exemplary embodiment of FIG. 7. Here sensors 830 are furnished between the rings 110, and these sensors are able to determine relevant measurement data for the blown film, such as its position, thickness or temperature. Regulation may be established by means of these sensors, as has already been described in connection with FIG. 7. The data are fed to a computing apparatus, not shown, which compares the measured data with target data and on that basis, generates control signals for the rings or fluid stream and for the target pressure inside the box 701. Such regulation is furnished separately for each ring, but preferably the generation of these control signals also takes into account the data and signals from at least one additional ring.

Figure 9:
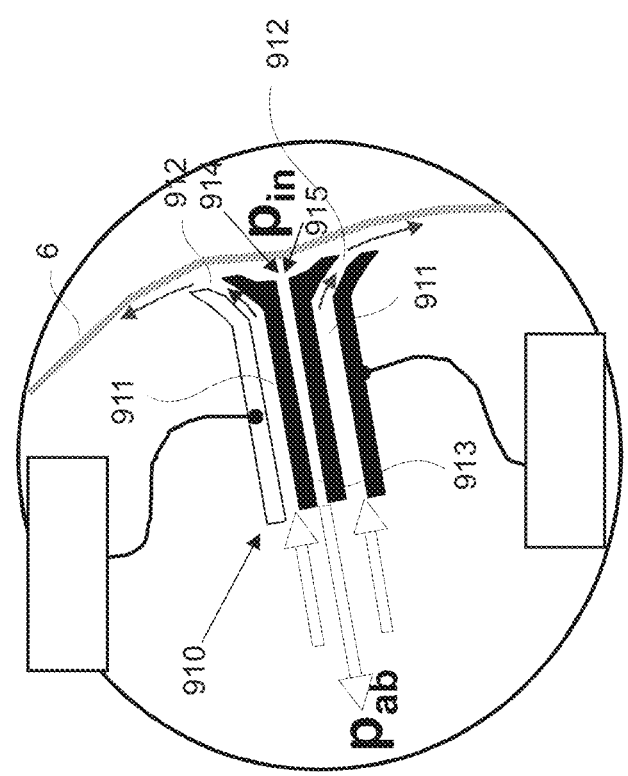
FIG. 9 shows a ring according to an embodiment of the invention.

FIG. 9 shows an additional variant of a ring 910, which is similar to a ring 110. Compared to the embodiment of FIG. 5, the ring 110 does not comprise one partial flow; rather, from the outset it comprises two separate channels 911 for both partial streams of the fluid stream.

However, the outlet regions 912 are designed in the same way as in the example of FIG. 5; in other words, in this case also the cross-section becomes narrower, so that the effects described in connection with FIG. 5 occur. Instead of the flow divider 505, a suction nozzle 913 is furnished, the suction end 914 of which is configured similarly to the flow divider 505. The suction nozzle is preferably used to further evacuate the space 915 between the blown film 6 and the suction end 914. In this way, the blown film 6 may be subjected to an additional force directed outward. Such a ring may replace all rings 110 shown in the other drawings. The suction nozzle may be connected separately to a negative-pressure source with the pressure pa, or simply terminate inside the box, so that the pressure $p_{sys}$ also acts via the suction nozzle 913 in the space 915.

Figure 10:
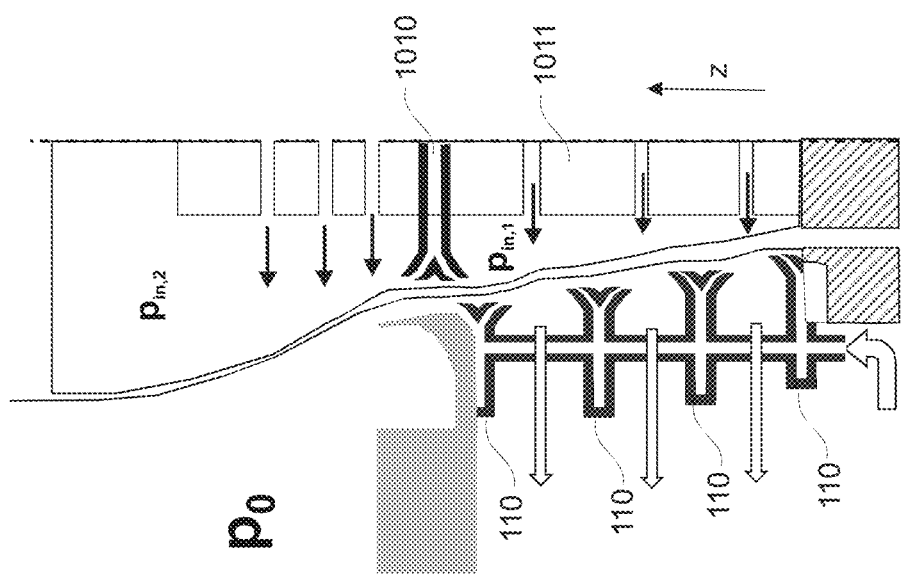
FIG. 10 depicts an alternative embodiment of the invention.

The exemplary embodiment of FIG. 10 does not require a box. Although the blown film is no longer pulled against the rings 110 by an additional underpressure, an additional pressurization device is furnished. Within the blown film 6, an additional ring 1010 is furnished, constructed like a ring 110 and comprising the same functionality. This ring 1010 acts as a seal, so that the inner space of the blown film 6 may be subdivided into two pressure zones. The prevailing pressure is $p_{in,1}$ below the ring 1010, and $p_{in,2}$ above the ring. The pressure $p_{in,1}$ preferably may be adjusted in such a way that it develops the same force effect as the pressure $p_{sys}$, as set forth in connection with the above-described exemplary embodiments. The additional pressurization device 1011 may be constructed similarly to internal cooling devices already known in the art, by means of which a blown film 6 may be cooled from the inside. The advantage of the embodiment of FIG. 10 is that condensates that emerge from the blown film as gas and precipitate on the rings 110 may be easily removed, for example wiped, from the rings and other parts. Such condensates are chiefly paraffins.

Figure 11:
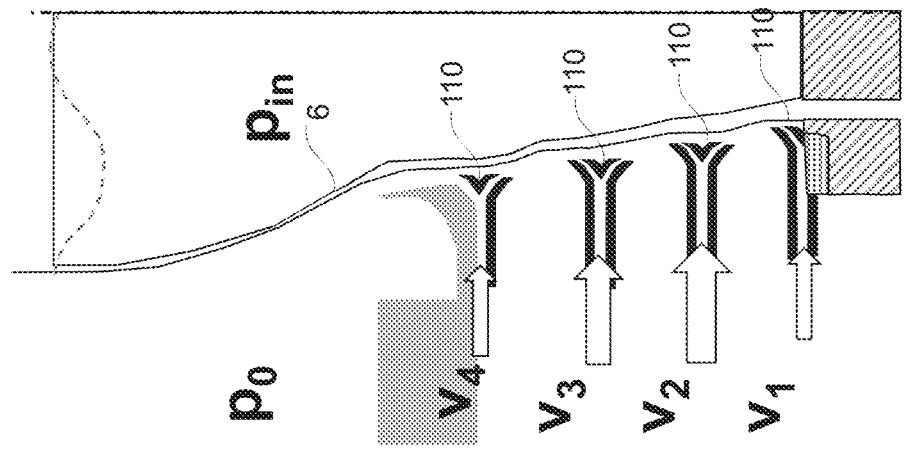
FIG. 11 shows another alternative embodiment of the invention.

FIG. 11 discloses an exemplary embodiment in which the fluid stream of each of the individual rings 110 has a different size. In other words, preferably, the volume flows of the fluid in each ring are different and preferably adjustable. This is symbolized by the indications $v_1$, $v_2$, $v_3$ and $v_4$. Accordingly, in this case, the cooling power may be varied over the height of the blown film 6.

An advantageous development of the present invention will now be explained with reference to FIG. 12. A plurality of modules 1220 for controlling the temperature and/or the volumetric flow of the fluid stream is furnished on at least one of the rings, distributed over the circumference. The effect is illustrated in FIGS. 12*a* and 12*b*. As FIG. 12*a* shows, viewed in the circumferential direction of the blown film, the fluid stream may have different temperatures at different angular positions. This is illustrated by the indications $T_1$, $T_2$, $T_3$. As FIG. 12*b* shows, viewed in the circumferential direction of the blown film, the fluid stream may have different volumetric flows at different angular positions. This is illustrated by the indications $V_1$, $V_2$, $V_3$. In connection with a measuring apparatus for measuring the thickness of the blown film as a function of the angular position and with a corresponding control of the modules 1220, a regime may be provided under which the desired thickness of the blown film may be regulated at different angular positions, i.e. the profile may be regulated over the circumference of the blown film 6.

The embodiment of FIG. 13 resembles that of FIG. 10, but the ring 1010 is omitted. However, the structure and advantages of the invention substantially correspond to the exemplary embodiment of FIG. 10.

FIG. 14 discloses an arrangement of the rings 110, wherein at least a part of the rings 110 has an inner diameter that is smaller than the diameter of the outlet nozzle 5. In this way, a larger inflation ratio (ratio of minimum to maximum diameter) of the blown film 6 may be achieved.

FIG. 15 shows another exemplary embodiment of the invention, in which rings 110 are used to hold a cooling liquid 1511, which has been applied to the blown film 6 by the rings 1510, in that location. The rings 110 thus serve as seals that prevent the cooling liquid from flowing away. In this way, liquid cooling may be furnished in blown film lines that are known in the art, and by this means the cooling rate of the blown film may be further increased. If the rings 110 and 1510 are arranged in a box, for example the box 101, then the liquid may be suctioned off via the suction channel. FIG. 16 shows a similar exemplary embodiment in which a ring 1610 is constructed like a ring 110. A liquid stream is furnished as the fluid stream in the ring 1610.

FIG. 17 shows a development of the invention, which again addresses the problem of precipitating condensates. The condensate collecting on the underside of a condensate may flow to the drip run 1711, which is arranged on the underside of the ring 110. The drip run ensures that the condensate drips at an intended location, so that it does not reach the blown film 6. The ring 110 placed thereunder is advantageously equipped with a drip tray 1710, by means of which both the condensate dripping down and the condensate that condenses directly may be collected. The condensate may be collected in a waste container via discharge lines, not shown.

FIG. 18 shows an exemplary embodiment in which an arrangement according to one or more of the exemplary embodiments shown and described above is arranged not outside, but inside the blown film 6. However, the function and advantages of this embodiment are the same as the other exemplary embodiments.

FIG. 19 describes an embodiment of the rings 110, in which the fluid stream is directed by the outlets not only in the transport direction z and/or the radial direction r of the blown film, but at least partially also in the circumferential direction of the blown film. In this case, guiding elements that direct the fluid stream in the desired direction may be furnished inside the rings. In this way it may be achieved that the fluid spreads better over the circumference of the blown film, resulting in an improved cooling effect. In addition, a cross-orientation may be impressed on the blown film. This may lead to better stability of the blown film and the film product subsequently manufactured from it.

The ring 110 according to FIG. 20 may be rotatably mounted, and in that case it may be rotated relative to the outlet nozzle. Nevertheless, it is also advantageous for the two rings 110 to be relatively rotatable. This rotatability is illustrated by the arrow 2020. In this case, the walls 520, 521 and/or flow divider 505 may be rotatable relative to each other. Relative rotation may be brought about by a directed fluid stream having a directional component in the circumferential direction. Advantageous in this case are outlets 509 and 510, which comprise walls with openings, wherein the fluid stream may be steered in the desired direction by means of the openings. Alternatively, a drive may be furnished that serves to rotate the rings.

In an additional embodiment of the invention according to the exemplary embodiment of FIG. 20, the rings 110 or the components of the rings are rotated reversingly, i.e. the rings may be deflected by a—usually fixed—angular quantity to the right and to the left. In particular, in connection with the covers 2030 shown in FIG. 20, a reversing influence may be impressed on the blown film. At the places where the cover interrupts the fluid stream, there is less cooling than at other places. Such places thus remain warmer and the viscosity is greater, so that the blown film may "liquefy" there. These places become thinner. Advantageously, the reversing of the rings 20 is harmonized with the reversing device 15 in such a way that these thin places are always at the same positions of the flattened film, for example at the edges of the film. This is particularly advantageous if the film is stretched inline or offline in the longitudinal direction in "MDO" devices. That is because in this process, the film is narrower in the transverse direction and thickens at the lateral edges. If these lateral edges were thinner previously, after the thickening a film thickness is produced that preferably corresponds as much as possible to the thickness in the middle of the film. In this way, it is possible to reduce the waste produced by cutting off the side areas that differ too greatly in film thickness.

FIG. 21 shows an embodiment in which the wall 520, the wall 521 and/or the partial flows are partitioned. In this case, a stationary part 525, 526, 527 and movable part 530, 531, 532 are respectively furnished. The respective movable part is displaceable relative to the associated fixed part, and in particular it is height-displaceable in the z direction. This may be accomplished in various ways. However, only one embodiment is shown, in which the movable and the associated stationary part each respectively comprise a thread, so that the movable part may be screwed into the stationary part. If the respective parts move against each other, as indicated by the arrows 540 and 541, the height is adjusted automatically, as indicated by the arrows 550 and 551. By means of adjusting the movable parts relative to the associated stationary parts, in particular a height adjustment of the movable parts relative to each other may be realized. In this way, the sizes of the outlets 509 and 510 may be varied. Thus, the fluid stream may be adjusted, and ultimately the cooling power may be adjusted.

FIG. 22 shows an embodiment of the invention in which three rings 110, 110' and 110" are shown in addition to the cooling ring 107. In the left part of the drawing, a top view of the rings is shown. As may be seen, only the ring 110 and the cooling ring 107 are circular. The two subsequent rings 110' and 110" in the transport direction z of the blown film 6 have an eccentricity. In other words, these rings are formed as ellipses. In more general terms, it is advantageous if at least one ring 110 is formed as an ellipse. By means of such a configuration, the film properties may be varied over the circumference, in particular with regard to the film thicknesses. Thus, it is possible to produce films which are more suitable for certain applications, for example for stretch hoods, shrink hoods or FFS sacks. Here it may be advantageous if the edges, which are subjected to greater loading later, are provided a greater wall thickness than the remaining areas during production. In the exemplary embodiment shown, in the ellipses, the semi-major axes are arranged parallel to each other. It may also be advantageous—depending on the application of the film to be produced—for the semi-major axis of one ring to run parallel to the semi-minor axis of another ring. Other angles between the major semi-axes may also be advantageous.

In FIG. 23, an additional exemplary embodiment of the invention is shown, which is similar to the exemplary embodiment of FIG. 15. In this exemplary embodiment, the cooling box 12 is shown explicitly. The rings 1510 correspond to those of the exemplary embodiment of FIG. 15. In the transport direction z of the blown film 6, an air seal 2310, which preferably is also ring-shaped, adjoins the rings 110 and 1510. It is preferred to arrange this air seal below the cooling ring 107. In an advantageous development, the air seal is designed as a body in which at least the surface facing the blown film comprises material that is at least partially porous, and in particular microporous. The porous material in this case comprises openings with a maximum size of 500 micrometers. A material with such openings is usually sintered material, particularly sintered ceramic, sintered metal or sintered plastic. The air seal is a gas, in particular air, that may be supplied via a line 2320 and has an increased pressure relative to the ambient pressure. This pressure in turn may be generated with a blower or a compressor.

The embodiment according to FIG. 24 shows an embodiment of the invention that resembles the embodiment according to FIG. 9. Instead of the suction nozzle, however, there is a liquid reservoir 2410, to which a liquid and optionally also a gas may be supplied in order to achieve better cooling power. Compared to FIG. 9, the liquid reservoir comprises a supply line 2420 for the liquid and an optional supply line 2421 for the gas. Water may be preferably used as the liquid, and air may be preferably used as the gas. The supply channels 911 are preferably unchanged from the exemplary embodiment of FIG. 9 and are furnished above or below the liquid reservoir 2410.

FIG. 25 shows an additional advantageous exemplary embodiment of the invention, by means of which the cooling power may be further increased. In this exemplary embodiment, the flow divider 2505 (see enlargement of the circled area in FIG. 25) is penetrated by lines 2506 through which a temperature-controlled fluid may be passed, by means of which the flow divider 2505 may be temperature-controlled. For example, water, thermal oil or another liquid with a high specific heat may be used as the fluid. It is particularly advantageous if the blown film is in contact with the flow divider in order to achieve the greatest possible heat transfer.

The flow divider 2505 may be divided into segments over the circumference of the blown film 6, in which case preferably each segment may be individually temperature-controlled, independently of other segments. In this way the blown film in turn may be influenced differently over the circumference, in particular with regard to the wall thickness of the blown film.

In order to obtain the largest possible contact surface between the blown film 6 and the flow divider 2505, it is particularly advantageous to configure the flow divider according to FIG. 9, i.e. in particular to additionally configure the flow divider as a suction nozzle 913. This is shown in FIG. 26. Suction channels 2507 may then be furnished transversely to and between the lines 2506 in order to be able to straightforwardly apply an underpressure to the space between the flow divider 2505 and blown film 6.

| List of Reference Signs | |
|---|---|
| 1 | Blown film line |
| 2 | Extruder |
| 3 | Line |
| 4 | Distribution tool |
| 5 | Outlet nozzle |
| 6 | Blown film |
| 7 | Calibration apparatus |
| 8 | Tempering apparatus |
| 9 | Flattening apparatus |
| 10 | |
| 11 | Tube axis |
| 12 | Cooling box |
| 13 | |
| 14 | |
| 15 | Reversing device |
| 16 | Roller |
| 101 | Box |
| 102 | Blown film passage |
| 103 | Exhaust opening |
| 104 | Arrow |
| 105 | |
| 106 | Arrow |
| 107 | Cooling ring |
| 108 | |
| 109 | |
| 110 | Rings |
| 111 | Supply channel |
| 112 | Arrow |
| 113 | Arrows |
| 114 | Tool |
| 501 | Opening |
| 502 | Arrow |
| 503 | Inner space |
| 504 | Expanded area |
| 505 | Flow divider |
| 506 | Split arrow |
| 507 | Arrow |
| 508 | Arrow |
| 509 | Outlet |
| 510 | Outlet |
| 511 | Area between flow divider 505 and blown film 6 |
| 512 | Arrow |
| 513 | Outward force |
| 520 | Wall |
| 521 | Wall |
| 525 | Stationary part |
| 526 | Stationary part |
| 527 | Stationary part |
| 530 | Movable part |
| 531 | Movable part |
| 532 | Movable part |
| 540 | Arrow |
| 541 | Arrow |
| 550 | Arrow |
| 551 | Arrow |
| 601 | Box |
| 701 | Box |
| 703 | Suction channel |
| 830 | Sensors |
| 910 | Variant of a ring |
| 911 | Two separate channels |
| 912 | Outlet area |
| 913 | Suction nozzle |
| 914 | Suction end |
| 915 | Space |
| 1010 | Ring |
| 1011 | Pressure loading device |
| 1220 | Modules |
| 1510 | Rings |

-continued

| List of Reference Signs | |
|---|---|
| 1610 | Ring |
| 1710 | Drip tray |
| 1711 | Drip run |
| 2020 | Arrow |
| 2030 | Cover |
| 2310 | Air seal |
| 2320 | Line |
| 2410 | Liquid reservoir |
| 2420 | Supply line |
| 2421 | Optional supply line |
| 2505 | Flow director |
| 2506 | Line |
| 2507 | Suction channels |

The invention claimed is:

1. A blown film line apparatus for manufacturing a blown film, the apparatus comprising:
   at least one film extruder configured to generate at least one melt strand;
   at least one melt distribution tool configured to convert the at least one melt strand into a circulating melt layer;
   a film outlet nozzle configured to dispense the circulating melt layer, to form the blown film;
   at least one film cooling device configured to cool the blown film with at least one fluid stream provided around the blown film in a circular manner;
   at least one pressure-providing device configured to use overpressure or underpressure on one side of the blown film to convey the blown film to the film cooling device,
   a cooling ring disposed above the at least one pressure-providing device and the at least one film cooling device; and
   at least one control module configured to control the manufacturing of the blown film,
   wherein each film cooling device includes a flow divider configured to divide one of the at least one fluid stream into a first partial stream and a second partial fluid stream; and
   wherein the at least one film cooling device further includes a drip run, located external to the blown film, configured to ensure that condensate drips at an intended location and does not reach the blown film;
   wherein the at least one control module is configured to control temperatures and volumetric flows of the at least one fluid stream associated with a plurality of angular positions along a circumference of the film cooling device.

2. The blown film line apparatus according to claim 1, wherein the at least one control module is configured to control the at least one fluid stream in accordance with a desired thickness of the blown film along the circumference.

3. The blown film line apparatus according to claim 1, wherein the at least one fluid stream is a stream of air.

4. The blown film line apparatus according to claim 1, further comprising a film sealing device configured to seal off the at least one pressure-providing device from an outer environment.

5. The blown film line apparatus according to claim 1, wherein the at least one pressure-providing device is configured to provide an underpressure to the exterior surface of the blown film, and further comprising an additional pressure-providing device configured to provide an overpressure to the interior surface of the blown film via a plurality of ducts.

* * * * *